United States Patent [19]

Heisler

[11] 4,398,726
[45] Aug. 16, 1983

[54] PIPE SECTION INCLUDING A GASKETED SPIGOT END AND METHOD OF MAKING THE SAME

[75] Inventor: Robert W. Heisler, Littleton, Colo.

[73] Assignee: J-M Manufacturing Company Inc., Stockton, Calif.

[21] Appl. No.: 280,665

[22] Filed: Jul. 6, 1981

[51] Int. Cl.³ .................. F16J 15/10; F16L 21/02
[52] U.S. Cl. ............................... 277/1; 277/203; 277/207 A; 277/208; 285/288; 285/291; 285/293; 285/295; 285/DIG. 16
[58] Field of Search .......... 277/1, 203, 207 R, 207 A, 277/DIG. 6, 208; 285/288, 291–293, 295, 296, DIG. 16, 21

[56] References Cited

U.S. PATENT DOCUMENTS

| 843,892 | 2/1907 | Haller et al. | 285/293 |
| 1,057,267 | 3/1913 | Phelan | 285/288 |
| 2,138,946 | 12/1938 | Trickey | 285/288 X |
| 3,904,213 | 9/1975 | Swanson et al. | 285/288 X |
| 3,937,641 | 2/1976 | Kushner et al. | 285/DIG. 16 X |

FOREIGN PATENT DOCUMENTS

| 145027 | 2/1952 | Australia | 285/288 |
| 970797 | 7/1975 | Canada | 285/288 |
| 1476758 | 3/1967 | France | 285/295 |
| 781481 | 11/1980 | U.S.S.R. | 285/DIG. 16 |

Primary Examiner—Robert S. Ward, Jr.
Attorney, Agent, or Firm—L. David Rish

[57] ABSTRACT

Certain pipe sections require an annular sealing gasket to be permanently positioned on the spigot portion. This is especially desirable with pipe sections formed with helically preceding reinforcing ribs. Disclosed is pipe section including a spigot end 2 having an annular groove 4 positioned adjacent the end surface thereof. Within groove 4 is placed fluid, settable bedding material 14 which has positioned therein and impregnated thereby a reinforcing material 15, preferably consisting of a ribbon of fiberglass material. Annular sealing gasket 3 is positioned in this groove 4 and onto the settable material 14 which is caused to intimately contact both the surface of the groove 4 and the sealing gasket 3. The thus sealed, bonded and reinforced spigot end retains the structural integrity and resistance to crushing loads and impact strength as is inherent in the rib reinforced pipe section.

10 Claims, 5 Drawing Figures

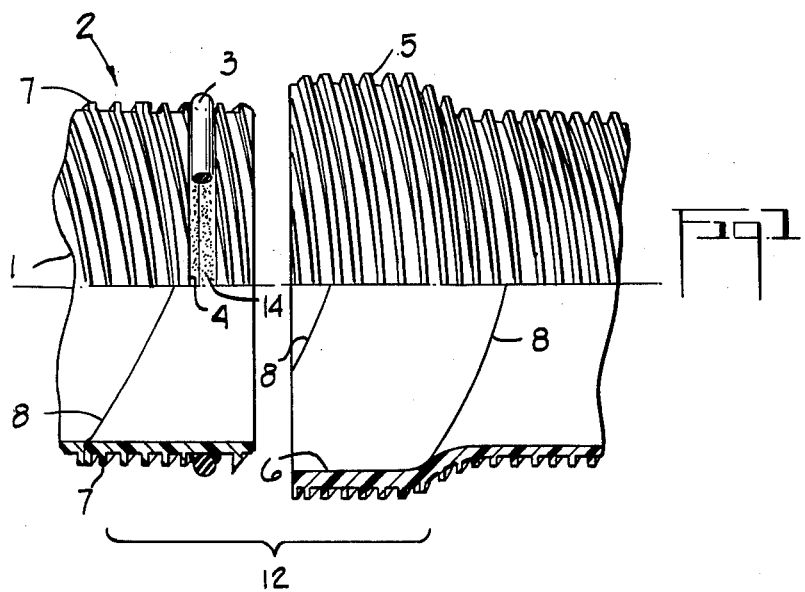
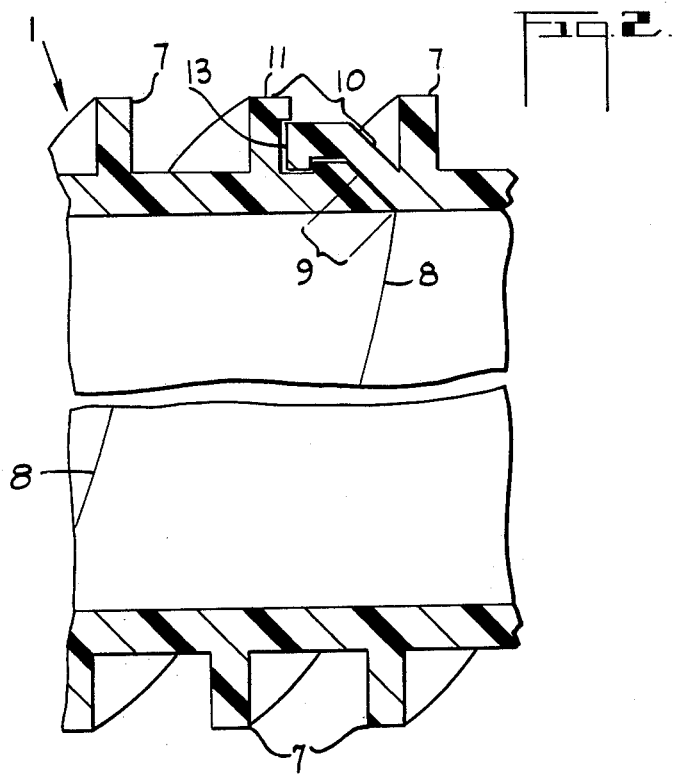

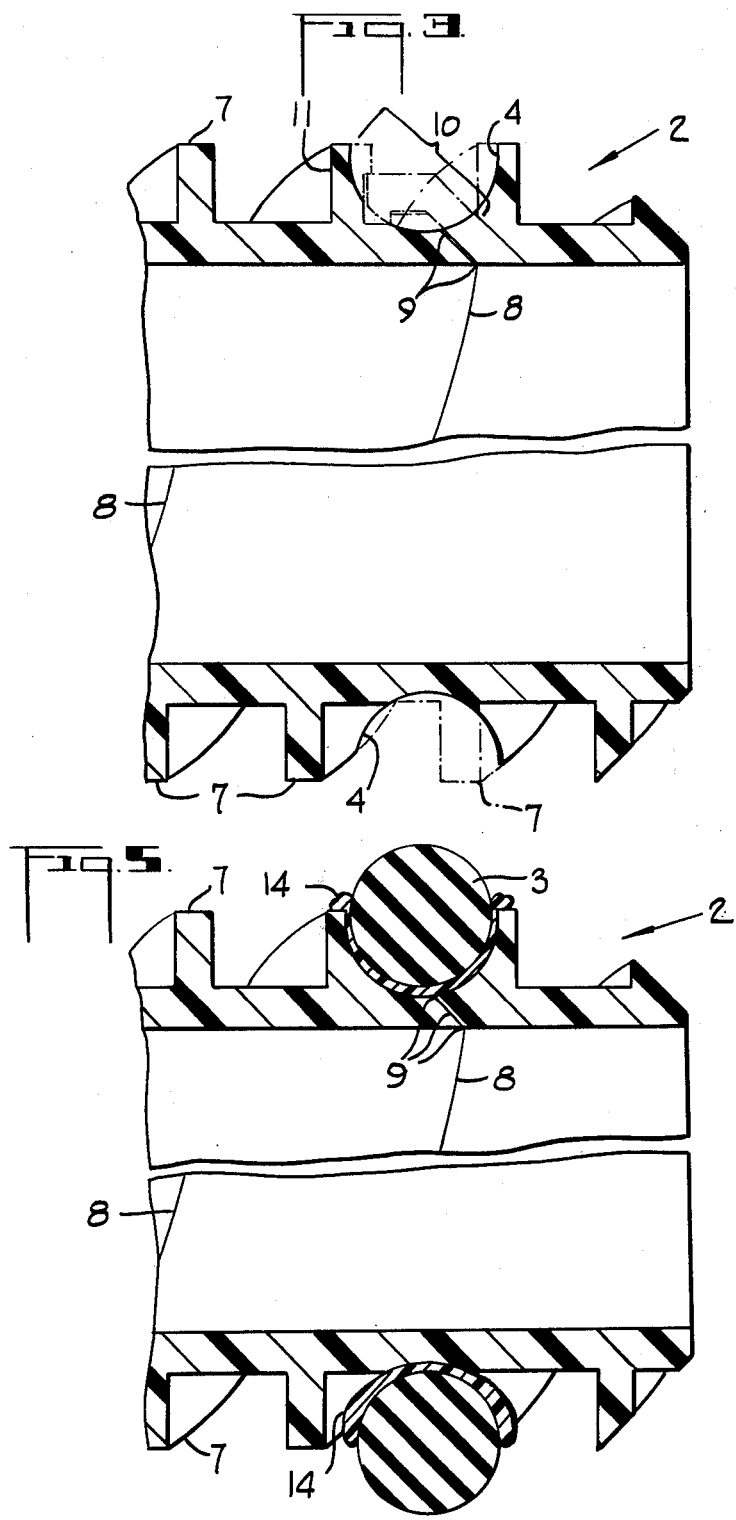

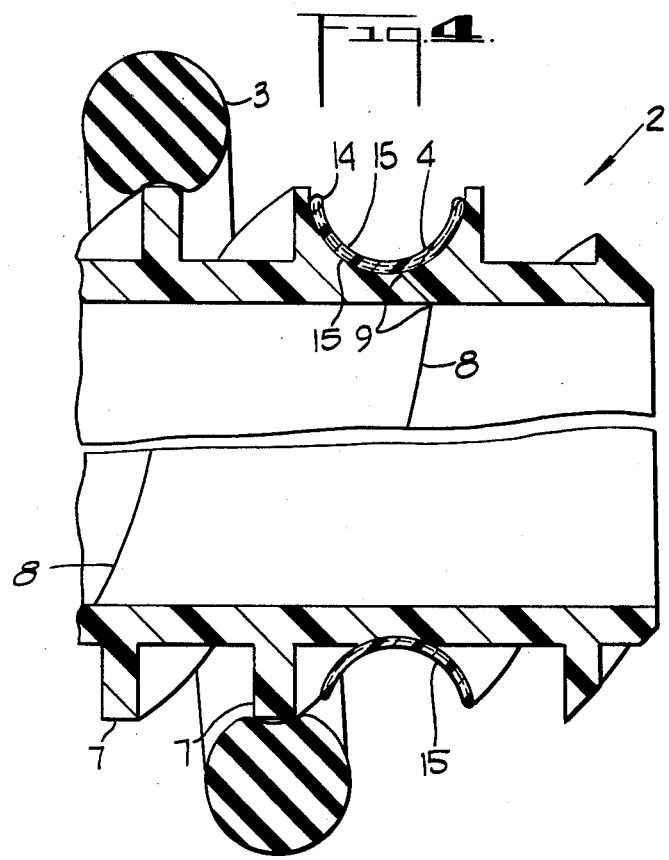

PIPE SECTION INCLUDING A GASKETED SPIGOT END AND METHOD OF MAKING THE SAME

TECHNICAL FIELD

The present invention relates to the joining of sections of pipe, and specifically the joining of sections of thermoplastic pipe preferably using a system of an integral bell and spigot. This invention also relates to the formation of the spigot portion of such a bell and spigot joint on pipe sections having an external spirally ribbed configuration. This specific type of pipe is made by helically winding a ribbon of thermoplastic material and joining the thus wound material at the overlapping edges thereof. Ribs are usually provided along the outer surface of the pipe to stiffen the pipe and permit it to support crushing loads.

BACKGROUND OF THE PRIOR ART

The usual method of joining sections of pipe made of a thermoplastic material is to provide one end of such a section of plastic pipe with an integral bell portion. This bell portion is formed by heating the end section and distorting the end section over a mandrel to form the properly sized and enlarged bell. Most desirably, an inwardly opening annular groove is provided during or subsequent to this belling operation so that a sealing ring of an elastomeric material may be incorporated either removably or fixedly in the bell portion. This sealing ring is sized to sealingly engage the spigot end of another section of such plastic pipe, thus forming a fluid-tight joint between these two sections. However, should these plastic pipe sections incorporate certain strengthening features on the outer surface thereof, specifically helical, the formation of such a watertight bell and spigot joint becomes more difficult. The spigot end of such a pipe no longer presents a smooth, uninterrupted outer circumference to which such a bell supported sealing ring can sealingly engage.

Accordingly, in the past it has been found necessary to alter the outer surface of the ribbed spigot in order to provide such a sealing surface. In one known joint construction, an annular groove is cut completely through the intersecting ribs at the spigot end of a ribbed pipe. A conventional sealing gasket is positioned in the groove and forms a seal between the resulting smooth annular surface and the inner surface of a surrounding pipe bell. Another system is disclosed in U.S. Pat. No. 3,635,505 in which a sealing ring is incorporated on the spigot portion between adjacent projecting rib portions. A groove is machined between intervening projecting ribs so as to connect the thus rib defined groove and form a seat for a specially formed sealing ring, which includes a straight section which corresponds to the machined interconnecting slot. A system which uses a more conventional sealing ring, however, would be more desirable.

It is also known to adhere a rubber sealing ring in a groove in the bell portion of a pipe joint.

BRIEF SUMMARY OF THE INVENTION

Accordingly, disclosed is a pipe section comprising a spigot end which includes a sealing gasket positioned on the spigot end. This sealing gasket is positioned in an annular groove in the outer surface of the spigot end which is approximate the end surface of the spigot end. A bedding material sealingly engages and adheres to at least the radially innermost surface of this annular groove. There is means embedded in the bedding material for providing circumferential reinforcement to the pipe section at this annular groove. The sealing gasket is adhered to the groove by the bedding material. The sealing gasket extends radially outward of the groove such that when positioned in a bell portion of another pipe section, it is capable of sealingly engaging an inner circumferential surface of the bell portion. Also disclosed is a method of making a gasketed spigot end on a pipe section. This method comprises providing an annular groove in the outer circumference of the spigot approximate the end thereof; coating at least the radially innermost surface of this groove with a fluid, settable bedding material; and while the bedding material is in a fluid condition placing a resilient sealing gasket in the groove such that the bedding material intimately contacts this gasket. This bedding material is permitted to cure.

Also disclosed is a method of making a gasketed spigot end on a pipe section where the pipe section is formed of a helically wound ribbon of thermoplastic material with adjacent convolutions forming a helical seam therebetween. This method comprises providing an annular groove in the outer circumference of the spigot approximate the end thereof; coating at least the radially innermost surface of the groove with a fluid, settable bedding material. Before the bedding material sets a resilient sealing gasket is placed in the groove such that the bedding material intimately contacts the gasket. Finally, the bedding material is permitted to cure.

Preferably, the above method includes the step of determining the location of the intersection of the annular groove with the helical seam, and wrapping a reinforcing material around the circumference of the groove such that the intersection of the seam and the groove is covered with at least two layers of the reinforcing material.

BRIEF DESCRIPTION OF THE DRAWINGS

FIG. 1 shows the bell end and spigot ends of a pipe section, partially broken away, in accordance with the instant invention.

FIG. 2 shows a typical cross section of the pipe seam in accordance with the instant invention.

FIG. 3 shows the portion shown in FIG. 2 after the provision of the sealing ring groove.

FIG. 4 is similar to FIG. 3 showing the placement of the bedding material.

FIG. 5 is similar to FIG. 4 showing the positioning of the sealing ring.

DETAILED DESCRIPTION OF THE INVENTION

FIG. 1 shows pipe section 1. The spigot end 2 and bell portion 5 of the pipe section 1 are shown broken away to illustrate the normal relationship of these end portions just before the spigot end is seated within the bell portion to form bell and spigot joint 12. Pipe section 1 is distinctive in that the entire outer surface including the spigot end and bell portion are covered with helical ribs 7. Pipe section 1 can be formed by a number of known processes. Preferably, a ribbon of thermoplastic material having defined on at least one side thereof of plurality of ribs 7, is wound on a mandrel. The outer diameter of the mandrel thus defines the inner diameter of the pipe section. The adjacent edges of the ribbon are overlapped and cemented or welded and thus seam 8 is formed between adjacent helical convolutions of this ribbon.

Spigot end 2 includes annular groove 4 in which is placed sealing gasket 3. Sealing gasket 3 and its relation to the depth of annular groove 4 is such that sealing gasket 3 extends radially outwardly an adequate distance to engage an inner circumferential portion of the inner surface 6 of bell portion 5 in order to form a fluid-tight bell and spigot joint. On at least the innermost surface of the annular groove 4 is positioned a bedding material 14 which shall be set forth in greater detail with reference to subsequent figures.

FIG. 2 shows a detail of a typical longitudinal section of pipe section 1. The center portion of this longitudinal section has been eliminated and the opposite sides of the pipe are moved into juxtaposition for clarity. Between or adjacent a pair of parallel ribs 7 is positioned helical seam 8. In the preferred mode of the present invention, seam 8 can be described as having an inner seam struction 9 and an outer seam structure 10. The inner seam structure 9 comprises an intimately contacting pair of surfaces of the web portion of adjacent helical convolutions of the thermoplastic ribbon. The outer seam structure 10 utilizes a capturing rib 11 which is of similar dimensions to ribs 7 but has axially facing notch extending along its length. Within this notch of capturing rib 11 is edge 13.

FIG. 3 shows the same typical section as shown in FIG. 2 after severing and machining of annular groove 4 into its outer surface. This machining operation can be done with conventional rotary bits or routers. In this specific example, annular ring 4 has a generally semicircular shape in cross section, annular groove 4 passes through any intersecting rib 7 as can be seen in the lower portion of FIG. 3. At some point, annular groove 4 intersects the helical seam 8. In so doing, a substantial portion of the joint structure is removed. This can be seen in the upper portion of FIG. 3. At this intersection of the helical seam and the annular groove, the outer seam structure 10 has been machined away, leaving only the inner seam structure 9. This intersection, and the destruction of the outer seam structure 10 is inevitable if ring groove 4 is to be defined to a depth into the outer surface of spigot end 2 to form a reasonably continuous seat for subsequently applied sealing gasket.

FIG. 4 shows the spigot end of FIG. 3 with bedding material 14 applied. Bedding material 14 is placed at the radially innermost surface of annular groove 4. Prior to this application, however, sealing ring 3 is radially stretched around and rolled to a position on spigot 2 on the side opposite annular groove 4 from the end surface of the spigot end. Embedded in bedding material 14 is reinforcing material 15. Reinforcing material 15 consists of an elongated, flexible, porous reinforcing material of relatively high tensile strength. Preferably, this material is a ribbon of woven fiberglass which, compared to the thermoplastic material making up spigot end 2 and the elastomeric sealing gasket 3, is relatively inextensible. Note that in FIG. 4, two layers of reinforcing material 15 are shown overlying the intersection of the helical seam 8 with the annular groove 4. This should be contrasted with the single layer of reinforcing material 15 on the opposite side of the annular groove 4.

FIG. 5 shows an enlarged sectional view of the completed spigot end 2 of FIG. 1. Sealing gasket 3 has been rolled forward and has come to rest in annular groove 4. In so doing, gasket 3 has displaced the fluid, settable material comprising the bedding material 14. The lower portion of FIG. 5 shows bedding material 14 having been extruded out of the groove slightly and overlapping the adjacent cut surfaces of ribs 7.

Bedding material 14 is preferably elastomeric, fluid settable material such as a reactive polyurethane system. Such polyurethanes have excellent adhesion characteristics, even to such diverse materials as embodied in the preferred embodiment. Specifically, pipe section 1 is made of unplasticized PVC compound of conventional form. Sealing gasket 3 preferably is a solid, annular gasket of circular cross section of EPDM (ethylene propylene diene monomere) rubber having a hardness of 55 durometer. Other sealing gaskets may be used, for example, sealing gasket 3 could have an annular cavity positioned approximate the center of the circular body or it could be a closed cell foam of an elastomeric material.

While a urethane bedding material is preferred, other materials may be useful. For example, a hot melt adhesive may be used. The important characteristics of bedding material 14 should be kept in mind. Specifically, bedding material 14 must be in a fluid state long enough to permit the embedding of reinforcement material 15, and the placement of the sealing gasket 3 during this fluid state in order to permit intimate setting of the sealing gasket 3.

Preferably, bedding material 14 in its cured state has a hardness which is less than that of the PVC material making up the body of pipe section 1. Also, bedding material 14 should have a hardness which is greater than or equal to that of the sealing gasket 3. At the very least, however, bedding material 14 should not be characterized as "brittle".

Reinforcing material, as stated above, is preferably a ribbon of woven fiberglass. Other materials may be substituted. Such substituted material should have the characteristics of being elongated, flexible, porous enough to be impregnated by the chosen bedding material, substantially longitudinally inextensile (high modulous in tension), and should conform reasonably well to the confined space between the sealing gasket 3 and the innermost annular surface of the annular groove 4.

The method of forming the gasketed spigot will now be set forth in greater detail. The spigot end of pipe section was provided as shown in FIG. 3. As stated above, this is preferably done by machining the annular groove to the depth shown, which groove passes through the intersecting ribs and at least the outer portion of the helical seam 8. It is desirable to set the depth so as to intersect the continuous web portion of the thermoplastic ribbon making up the pipe in order to present a smooth surface on which bedding material 14 can be placed. However, since bedding material also serves to close any gaps between a subsequently installed sealing ring 3 and the groove 4, a shallower cut could be made and the gaps filled with the bedding material 14. Also, the machining step is not necessary although it is desirable since it does leave a fresh, easily bonded-to surface with beneficial effect to the overall strength of the finished spigot end. An alternative system would be to melt groove 4 through intersecting ribs 7.

The thus machined or grooved pipe section is placed on a rack of conventional form which permits the pipe section to be rotated. The intersection of the helical seam 8 and the annular groove 4 is determined. The chosen bedding compound is applied to the annular groove 4 and, either subsequently or simultaneously with this application, the fiberglass ribbon is placed in the groove by initially adhering one end of the ribbon over this intersection. As the pipe rotates, the fiberglass ribbon, preferably impregnated with a portion of the bedding material, is payed out and placed in the annular groove 4. The placement of the fiberglass ribbon is begun just one side of this intersection of the annular groove with the helical joint so that on completing one revolution, the fiberglass ribbon wrapping operation is terminated just on the other side of the intersection of the groove and the helical joint. In this manner, the intersection of the groove and helical joint is doubly reinforced.

While not necessary to the disclosed method, it has been found desirable to stretch sealing gasket 3 over the machined end of the spigot prior to the application of the bedding material and reinforcing material. The sealing gasket 3 is rolled past groove 4 to assure that the amount of stretch is equalized around the circumference of the ring. This also places the sealing gasket 3 in a convenient position so that, once the bedding material/reinforcing material is in place in the annular groove 4, the sealing gasket can merely be "rolled" into the groove. Once in position, sealing gasket 3 radially contracts by its own elasticity. This acts to smooth the bedding material 14, forcing the bedding material to intimately contact the inner portion of the sealing gasket 3 and virtually all portions of the annular groove 4. This is desirable since this also acts to force fill any chance gap between adjacent or contacting portions of the helical joint with the bedding material. This is especially desirable since much of the joint has been eliminated by the provision of the annular groove 4.

Once disclosed, as above, the benefits of Applicant's invention becomes apparent. Normally, even as the annular groove removes at least a portion of the reinforcing ribs 7, the spigot has adequate strength to overcome any normal structural stresses experienced while positioned within the bell portion 5. However, under abnormal conditions, the spigot end can be expected to be subjected to substantially greater stresses. For example, during unloading of a pipe section, should this pipe section be dropped on its spigot end it would be expected that the spigot end would endure high impact forces which would result in failure of the spigot end at the annular groove 4. Applicant has found, however, that the pipe section in accordance with Applicant's invention can endure such high impacts with no cracking associated with the annular groove. While Applicants should not be limited to a specific theory of operation, it is surmised that the bedding material acts to transmit such stresses around and throughout the sealing gasket/annular groove structure, thus eliminating the tendency of a stress concentration to take place in a portion of the grooved area. The incorporation of the fiberglass webbing or ribbon acts to prevent the impact stress from collapsing the pipe in the annular groove area. Such a collapse would tend to pull apart the somewhat weakened portion located at the intersection of the helical joint and the annular groove.

I claim:

1. A pipe section comprising a spigot end including a sealing gasket positioned on said spigot end, said sealing gasket positioned in an annular groove in the outer surface of said spigot end approximate the end surface of said spigot end, a bedding material sealingly engaging and adhered to at least the radially innermost annular surface of said annular groove, means embedded in said bedding material for providing circumferential reinforcement to said pipe section at said annular groove, said sealing gasket adhered to said groove by said bedding material, said sealing gasket extending radially outward from said groove, said means for providing circumferential reinforcement comprises an elongated, flexible, porous, longitudinally inextensile member positioned circumferentially around said spigot end in said groove, said circumferential reinforcement being impregnated by and substantially encapsulated in said bedding material.

2. A pipe section as set forth in claim 1 wherein said bedding material is an elastic material which has a hardness less than that of the material making up the pipe section but greater than or equal to that of said sealing gasket.

3. A pipe section as set forth in claim 1 wherein said bedding material is an elastic material selected so as to have a resiliency at least equal to that of the material making up the pipe section but wherein said resiliency is not more than that of the material making up the sealing gasket.

4. A pipe section as set forth in claim 1 wherein said means for providing circumferential reinforcement comprises a woven length of fiber glass tape.

5. A pipe section as set forth in claim 1 wherein said pipe section includes helically proceeding ribs at least on the outer surface thereof and at least one helical joint formed adjacent to at least a pair of said helically proceeding ribs, said circumferential groove intersecting said ribs and said joint, said means for circumferentially reinforcing said groove extending around said groove and overlapping said joint at least twice whereby the intersection of said groove and said seam is preferentially reinforced.

6. A method of making a gasketed spigot end on a pipe section comprising:
   (a) providing an annular groove in the outer circumference of said spigot approximate the end thereof;
   (b) coating at least the radially innermost surface of said groove with a fluid, settable, bedding material;
   (c) while said bedding material is in a fluid condition, placing a resilient sealing gasket in said groove such that said bedding material intimately contacts said gasket;
   (d) wrapping a reinforcing material around the circumference of said spigot end and in said groove before the step of placing said gasket; and
   (e) permitting said bedding material to cure with said reinforcing material being impregnated by and substantially encapsulated by said bedding material.

7. A method as set forth in claim 6 wherein the step of coating includes impregnating an elongated, flexible, porous reinforcing material of relatively high tensile strength with at least a portion of said bedding material and wrapping the thus impregnated reinforcing material around said circumference and in said groove, whereby said groove is structurally reinforced.

8. A method as set forth in claim 7 wherein said reinforcing material is a fiber glass tape.

9. A method as set forth in claim 7 wherein the length of said reinforcing material is greater than the circumference of said spigot end at said groove.

10. A method of making a gasketed spigot end on a pipe section, said pipe section formed of a helically wound ribbon of thermoplastic material with adjacent helical convolutions forming a helical joint therebetween, said method comprising:
(a) providing an annular groove in the outer circumference of said spigot approximate the end thereof;
(b) coating at least the radially innermost surface of said groove with a fluid, settable, bedding material;
(c) determining the location of the intersection of said annular groove and said helical joint, and wrapping a reinforcing material around the circumference of said groove such that the intersection of said seam and said groove is covered by at least two layers of said reinforcing material;
(d) before said bedding material sets, placing a resilient sealing gasket in said groove such that said bedding material intimately contacts said gasket; and
(e) permitting the bedding material to cure.

* * * * *